United States Patent
Guduru (10) Patent No.: US 7,219,171 B2
(45) Date of Patent: May 15, 2007

(54) FLOW CONTROL FOR DIGITAL SIGNAL PROCESSING TO SUPPORT DATA STREAM OPERATIONS

(75) Inventor: VijayaKrishna Prasad Guduru, Morris Plains, NJ (US)

(73) Assignee: Intel Corporation, Santa Clara, CA (US)

( * ) Notice: Subject to any disclaimer, the term of this patent is extended or adjusted under 35 U.S.C. 154(b) by 161 days.

(21) Appl. No.: 10/740,249

(22) Filed: Dec. 16, 2003

(65) Prior Publication Data
US 2005/0132106 A1 Jun. 16, 2005

(51) Int. Cl.
G06F 3/00 (2006.01)
H04L 12/26 (2006.01)

(52) U.S. Cl. .............. 710/52; 710/8; 710/51; 710/53; 710/56; 710/57; 370/236

(58) Field of Classification Search ............ 710/8, 710/51–53, 56, 57; 370/236
See application file for complete search history.

(56) References Cited

U.S. PATENT DOCUMENTS 6,633,609 B1 * 10/2003 Ing et al. .............. 375/240.03
6,944,129 B1 * 9/2005 Duncan .................... 370/236

* cited by examiner

Primary Examiner—Tammara Peyton
(74) Attorney, Agent, or Firm—Blakely, Sokoloff, Taylor & Zafman LLP (57) ABSTRACT

A method and apparatus are described for flow control for digital signal processing to support data stream operations. According to an embodiment of the invention, a method comprises setting a buffer number to an initial value; receiving a first data packet for processing during a first part of a first time frame, the data packet having a first data size; increasing the buffer number by an amount of data that can be passed to a coder; comparing the buffer number to a minimum amount of data for the coder; and setting a second data size to be received based on the comparison between the buffer number and the minimum amount of data for the coder.

30 Claims, 6 Drawing Sheets

FLOW CONTROL FOR DIGITAL SIGNAL PROCESSING TO SUPPORT DATA STREAM OPERATIONS

FIELD

An embodiment of the invention relates to signal processing in general, and more specifically to flow control for digital signal processing to support data stream operations.

BACKGROUND

In signal processing, data is often delivered in signal packets, with packets being sent in particular time blocks. For example, a parametric coder generally works on a set of samples or data, with the data arriving frame by frame and being decoded as the frames arrive. While the transfer and processing of data in such manner has advantages, this process can complicate certain operations.

In one example, signal processing may involve the processing of audio data, such as voice data for a voice mail or voice messaging system. The processing of such data by a parametric coder makes certain speed functions difficult. For example, it can be difficult to support functionality that would allow one to skip ahead in a voice message or to modify the speed of playback while not compromising the processing of the data or the quality of the output that is provided.

BRIEF DESCRIPTION OF THE DRAWINGS

The invention may be best understood by referring to the following description and accompanying drawings that are used to illustrate embodiments of the invention. In the drawings.

DETAILED DESCRIPTION

A method and apparatus are described for flow control for digital signal processing.

Before describing an exemplary environment in which various embodiments of the present invention may be implemented, certain terms that will be used in this application will be briefly defined:

As used herein, "DSP" or "digital signal processor" means a device or system that processes a digital/discrete signal. Processing may include encoding and decoding signals. Processed signals may include audio, video, or other media signals or data streams.

As used herein, "Control processor" or "CP" means a processor whose functions include providing commands and data to a digital signal processor.

As used herein, "parametric coder" means a coder that encodes parameters of a model representing an input signal, including a coder for coding voice or other audio data.

As used herein, "DTMF", "dual-tone multi-frequency", or "touch tone" means a system in which a specific sound frequency or tone is assigned to each key of a telephone.

Under an embodiment of the invention, flow control is provided for a digital signal processor (DSP). Under the embodiment, the flow control provides minimal delay for the data while providing sufficient data to operate the DSP. Under an embodiment of the invention, the DSP includes a parametric coder that receives data in frames.

Under an embodiment of the invention, the flow control for a DSP is read adjustable to changing coder rates. The rate is not changed during a play, but is instead changed during an idle period between frames. The DSP process may be utilized in providing speed control for a data stream. In addition, the flow control is read adjustable to a new coder block size. The adjustment to a new block size also is done during an idle period between frames.

With an application such as voice mail, voices messaging, or other similar audio application, there may be a desire to skip ahead in a message. In other situations, there may be a desire to adjust the speed of the data stream. For example, in a voice mail application, a user may increase the speed if certain portions of a message aren't important or slow down to carefully listen to certain information. Under an embodiment of the invention, a voice mail system may utilize speed control and skip ahead functions. The system may be controlled by, for example, holding a DTMF (dual-tone multi-frequency—also referred to as touch tone) button to signal an instruction over the line in the voice frequency band. The input from the user results in a command from an application program to the DSP.

A non-parameter coder generally works sample by sample. In contrast, a parameter coder works on a set of samples, comprising a set of data. The data arrives frame by frame in data packets and is decoded as the frames of data arrive. In such environment, any skip ahead or adjustments to speed are to be coordinated with the data process. If a parametric coder has a specific header format, it is generally difficult to support time variations. Under an embodiment of the invention, speed control (such as increases and decreases in the speed of playing voice streams) and skip ahead (such as parsing through specified bytes of a voice stream to jump ahead) are implemented with a parametric coder. The coder (or codec—coder-decoder) may have a different frame rate than the frame rate of the data. The devices may be running at different speeds.

Under an embodiment of the invention, a control processor (CP) provides data to the digital signal processor (DSP), with the DSP operating an algorithm to provide data flow control. Under an embodiment of the invention, there is a process, or "handshake", between the CP and the DSP and the flow control controls the data stream between the CP and DSP. The data stream may comprise any kind of data, including, but not limited to, audio, video, and other media data.

According to an embodiment of the invention, an operating system runs on the DSP, and the operating system operates on the basis of a plurality of tasks. The tasks include a command task, a flow control task, and an encoder/decoder task. In the command task, commands and data are exchanged, including the transfer of data from the CP to the DSP. The flow control task allows for diametric modification of data flow. The encoder/decoder task provides for processing of data.

Under an embodiment of the invention, initially the CP sends a data packet to the DSP, the data comprising a certain number of bytes. If there is a need for an adjustment of the data flow, the DSP tells the CP what modification is needed. Under an embodiment of the invention, the DSP receives commands from application programs, which may be via the CP, indicating what changes are needed. For example, the application program may instruct the DSP to skip ahead in decoding or to adjust the speed of the output. The DSP provides commands to the CP to make adjustments to the data flow if needed. If the CP does not receive a command from the DSP, the CP will continue to send the same size data packet to the DSP in each frame. At every frame control boundary, after the CP has finished sending any data packet, the flow control task calls a skip ahead function for the purpose of evaluating the data and determines how many blocks can be passed to the coder. The skip ahead makes the determination and lets the flow control know how many packets are decoded. For this purpose, the flow control determines a buffer number, which is a number representing the data that is going to the coder indicating how much data can be used.

Under an embodiment of the invention, if there is a command for an increase in the speed rate increases, the DSP will go through the data more quickly. If there is a command for a speed rate decrease, the DSP will go through the data more slowly. Under the embodiment, the DSP will sense the change in data usage, which will cause the flow control to request that more or less data be sent by modifying the data packets that will be sent.

Under an embodiment of the invention, if a command for a skip ahead is made, the message is presented to the DSP. The DSP makes a determination how many packets need to be sent to the DSP to allow the skip ahead. The DSP responds to the demands of the skip ahead and will request a change in data flow if needed. The CP makes the necessary adjustment and sends the packets to the DSP. The flow control controls what media stream data is sent to the DSP. The DSP then processes such data, sends the data to the bus, and the data is then transferred on according to its function. For example, the processed voice, video, or other data may be sent on to an amplifier and to the speaker unit for a telephone system or other similar system.

According to an embodiment of the invention, a coder may delay a certain amount of frames to allow for a skip ahead. If there is a skip ahead, then the process is capable of jumping to a later data packet and then adjusting the packets of data that are sent from the CP to the DSP.

Figure 1:
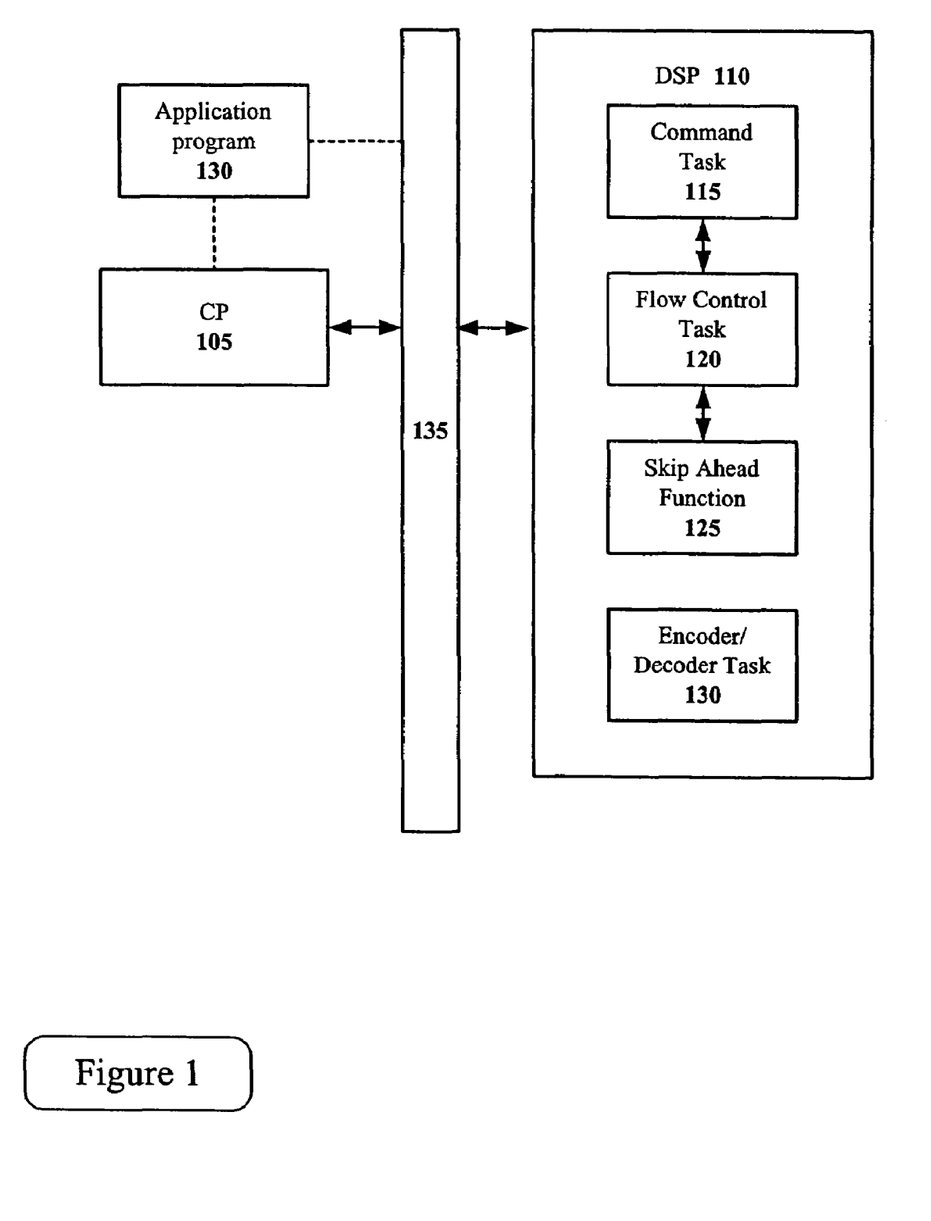
FIG. 1 illustrates an embodiment of media signal processing operations.

FIG. 1 illustrates an embodiment of media signal processing operations. In this illustration, a control processor (CP) 105 operates in conjunction with a digital signal processor (DSP) 110. The CP and DSP may operate through a bus 135. The DSP has an operating system that includes three tasks, a command task 115, a flow control task 120, and an encoder/decoder task 130. In this example, an application program 130 provides instructions to the DSP 110 via the operation of the CP 105. The instructions may include an instruction to skip ahead in the processing of the receiving data or to change speed of processing. The CP 105 may provide a data packet to the DSP 110 in every frame in conjunction with the command task. The initial data packet is of a certain size. The flow control task 120 then calls a skip ahead function 125 to evaluate the data and to determine how much data to forward to the coder. If the flow control 120 determines that the last packet size is appropriate, no action is taken by the flow control 120 and the coder 105 continues to send the same size packet. If the flow control 120 determines that more data is needed, such as a result of a timing change, the DSP 110 sends a message instructing the CP 105 to modify the data packet. The packet size may be increased or decreased as needed. The decrease may include a decrease to zero bits of data. The CP 105 will again continue sending the same amount of data until another command is received. As data is received, it is forwarded to the encoder/decoder task 130.

In the description of an algorithm for flow control under an embodiment of the invention, certain values may be utilized as follows:

Sbytes is the block size of the coder in bytes.

Smsec is the block size of the coder in milliseconds.

R is the rate at which the coder runs in milliseconds. If speed control is disabled, then the rate is R=Smsec.

InitBufNum is the initial number of buffers sent to the DSP by the CP, and is the number of buffers that can be used during a 12 msec period. Every time the speed rate changes the value of InitBufNum also changes.

This value may be calculated as follows:

$$InitBufNum = roundup[12/R]$$

BufNum is the current number of available data buffers, with each buffer being of size Sbytes. Initially BufNum=0 because initially there is no data available to the coder.

MinBufNum is the minimum number of data buffers (of size Sbytes) that is sufficient to run the coder. This may be calculated as follows:

$$MinBufNum = roundup[(12+DelayConst)/R] + SkipAheadDelay$$

ADTPS(x) means Adjust Data Transmit Packet Size and indicates a command message from the DSP to the CP to change the data packet size to x bytes.

SkipAheadDelay is the delay due to skip ahead support functions and represents the largest number of Smsec blocks that can be rejected by the Skip Ahead function or held off consecutively.

DelayConst is a delay constant with a value that depends on how quickly the CP can react to ADTPS messages from the DSP. According to one embodiment of the invention, the values of DelayConst may be as follows:

DelayConst=0 if the DSP send the ATDPS(x) message to the CP and receives back x bytes of data immediately DelayConst=12 if the ATDPS(x) message is in effect at the next 12 msec boundary DelayConst=24 if the ATDPS(x) message is in effect at the next 12 msec boundary or at the next following 12 msec boundary NextDataSize is the data size desired for the next transfer.

LastDataSize is the data size that was used in the last transfer. This may be initially calculated by multiplying the block size times initial number of buffers that are sent:

$$LastDataSize = Sbytes * InitBufNum$$

CoderDelay is the time period between the time that the first data is received and the time that decoding can commence, and is due to the SkipAheadDelay. This is the number of times Flow Control needs to be executed before the decoder can be spawned off. This value can be calculated as follows:

$$CoderDelay = roundup[SkipAheadDelay/roundup[12/R]] + 1$$

According to one embodiment of the invention, the CP sends a certain amount of data to the DSP, with the initial amount being:

LastDataSize=Sbytes*InitBufNum bytes

Unless the CP receives and processes a change request in the form of a ADTPS packet from the DSP, the CP will continue sending data of the same size as at the previous 12 msec boundary (for 12 msec time frames). At each 12 msec boundary, the command task calls the flow control after the CP has completed the process of sending packets to the DSP.

According to an embodiment of the invention, the flow control may call a skip ahead function. The skip ahead function processes the data (if any) from the CP and determines how many blocks (how many Sbytes) to pass to the coder. Skip ahead provides this number to the flow control. The flow control then increments BufNum as follows:

BufNum=BufNum+number of Sbyte blocks that came out of the skip ahead function

The flow control then calculates the data size for the next packets and sends a change request to the CP if this is needed:

```
//Calculate the data size for the next data packet:
    if(BufNum < MinBufNum)
        NextDataSize = Sbytes * (MinBufNum - BufNum) bytes;
    else
        NextDataSize = Sbytes * (MinBufNum - BufNum) bytes;
//Send ATDPS packet to the CP as necessary when the NextDataSize does
    not equal the LastDataSize:
    if(NextDataSize != LastDataSize)
    {
        Put ADTPS(NextDataSize) into message buffer;
        LastDataSize = NextDataSize;
    }
```

Figure 2:
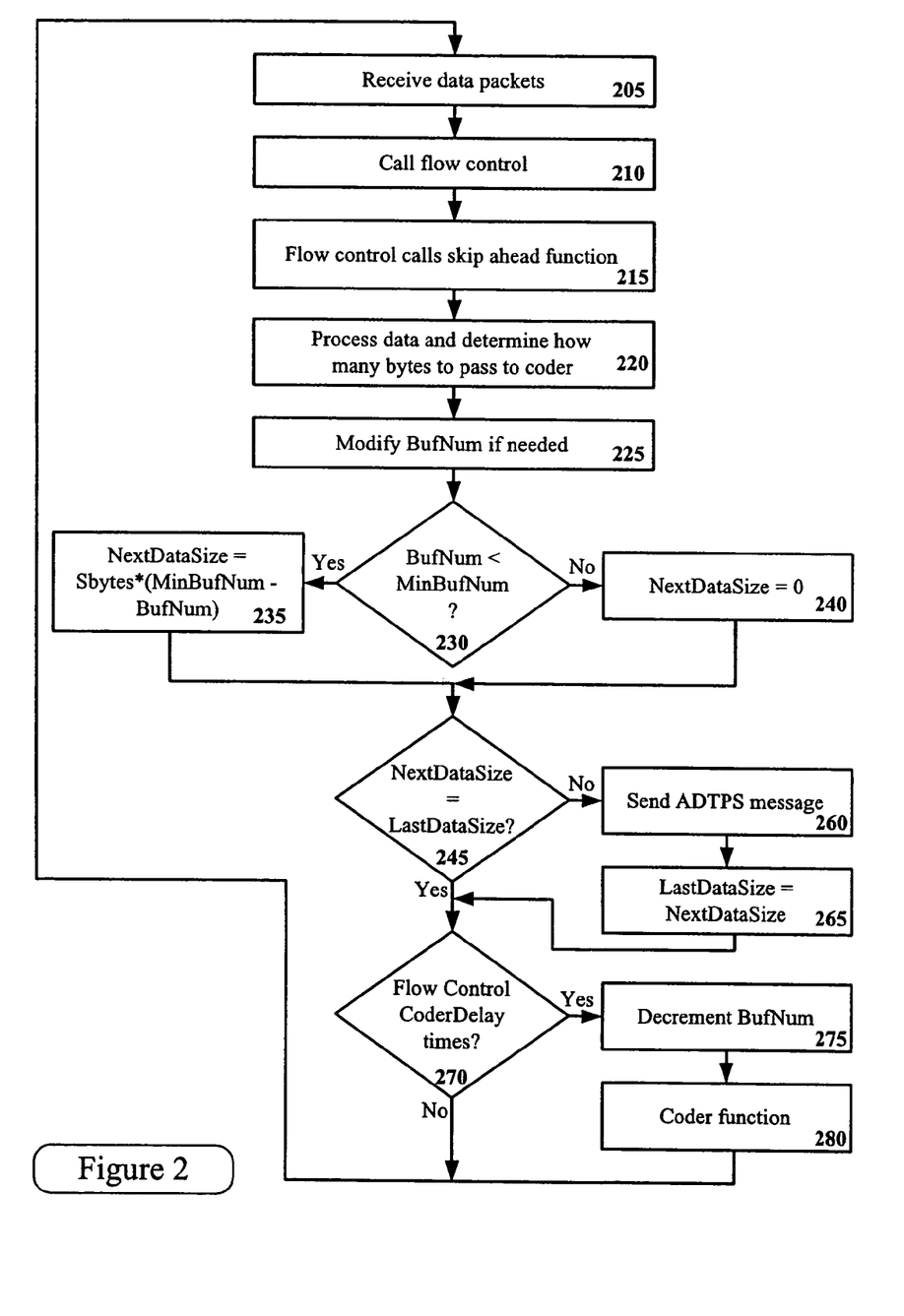
FIG. 2 is a flow chart illustrating an embodiment of the invention.

The coder starts running after the Flow Control is executed CoderDelay times. Every time the coder runs (every R msec), the number of buffers BufNum is decremented and the body of the coder instructions is run:

//Decrement BufNum
BufNum—;
//Run coder process
Coder Body;

FIG. 2 is a flow chart illustrating an embodiment of the invention. In this example, the DSP receives data packets 205. The DSP then calls the flow control task 210. The flow control task calls the skip ahead function 215, which results in processing data and determining how many bytes to pass to the coder. The DSP then modifies the buffer number 225, which is initially zero, by adding the number of data blocks indicated by the skip ahead function. There is then a comparison of the buffer number to the minimum number of buffers for the coder 230. If the buffer number is less than the minimum buffer number, the next data size is set at the Sbyte value times the difference between the minimum buffer number and the current buffer number 235. If the buffer number is equal to or greater than the minimum buffer number, then the next data size is set to zero 240 to allow the coder to catch up with the received data.

After the next data size is set, the next data size is compared to the last data size 245. If the values are not equal, then a message is sent requesting a change in data size (ADTPS) 260 and the last data size is reset to the next data size 265. If the comparison of the next data size and the last data size 245 indicates that the values are equal, then there is no need to send a message because the CP will continue sending the same size data packet until instructed to change. There is then a determination whether the flow control has been run a certain number of times (CoderDelay) 270, which provides a delay before the coder operates. If the flow control has been run the appropriate number of times, the buffer number is decremented 275 and the coder decodes a buffer of data 280. The process then returns to the receipt of data packets 205. However, the coder may not run at the same speed as the CP and thus the coder may not operate in the same time frame limitations.

Figure 3:
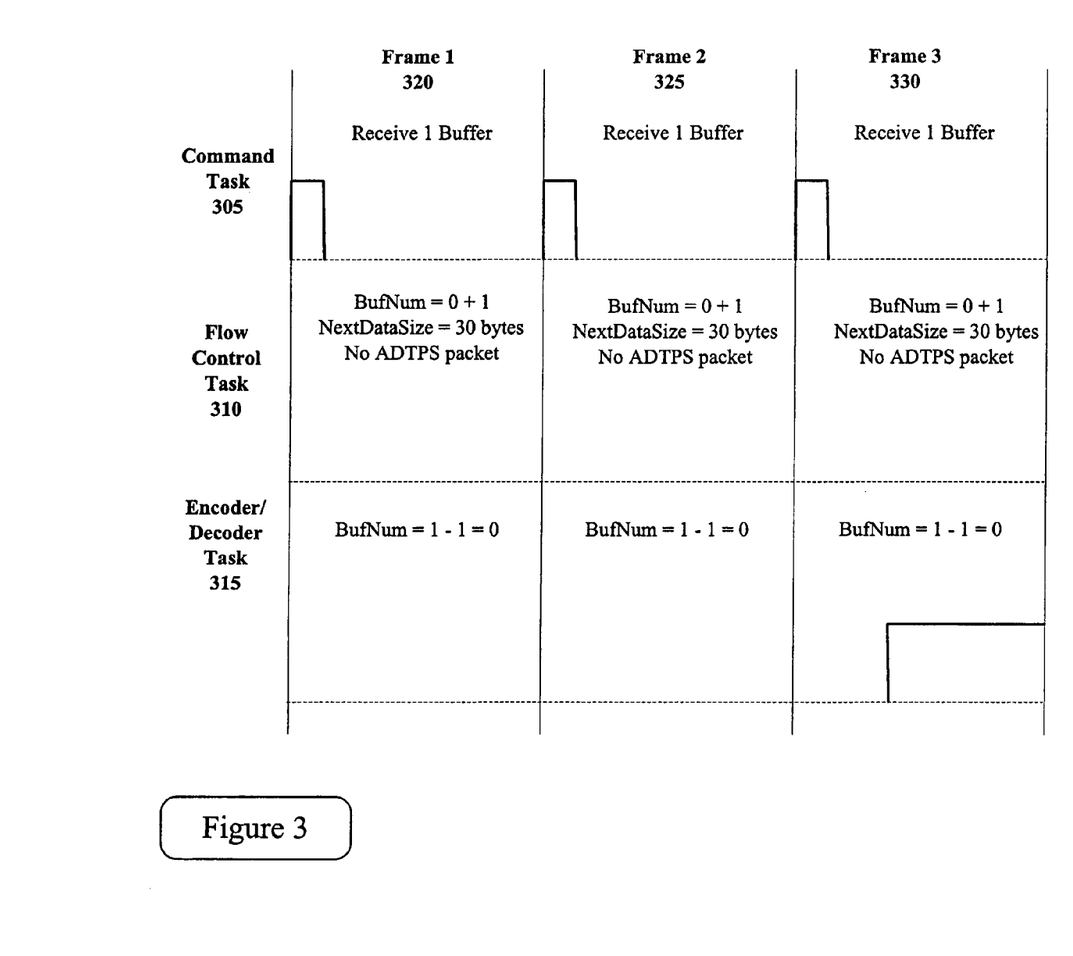
FIG. 3 illustrates an embodiment of signal transfers during a first set of time frames.
Figure 4:
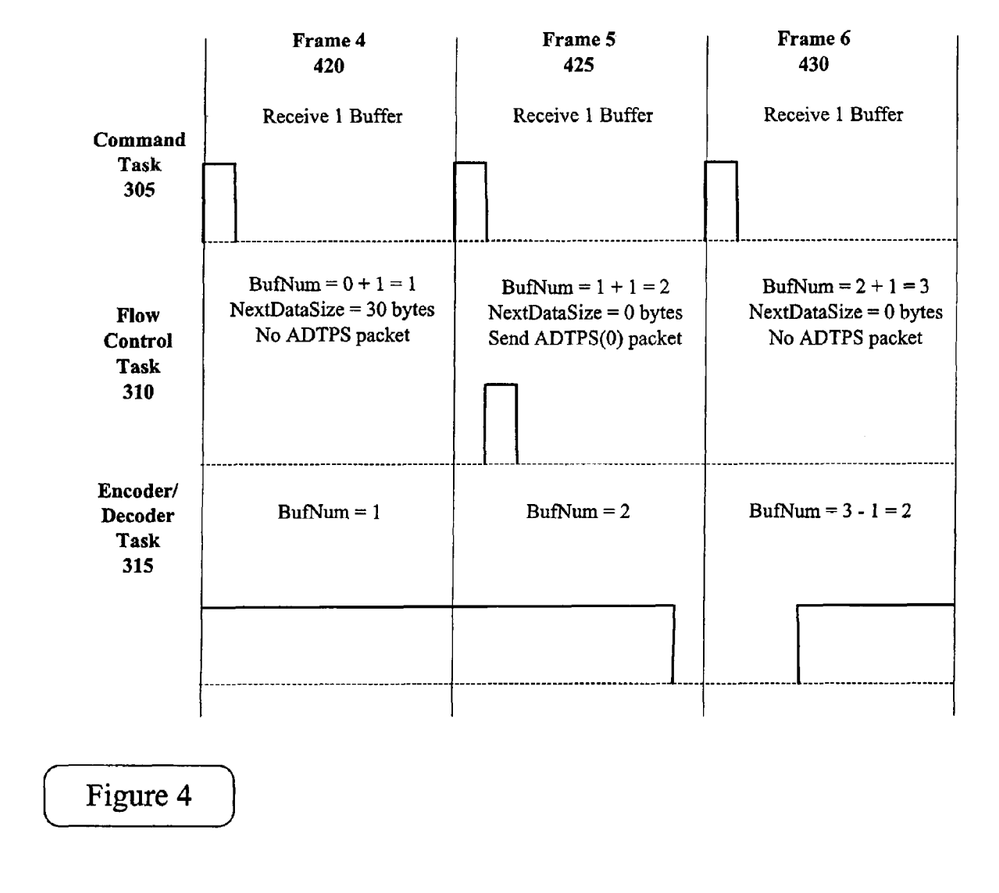
FIG. 4 illustrates an embodiment of signal transfers during a second set of time frames.
Figure 5:
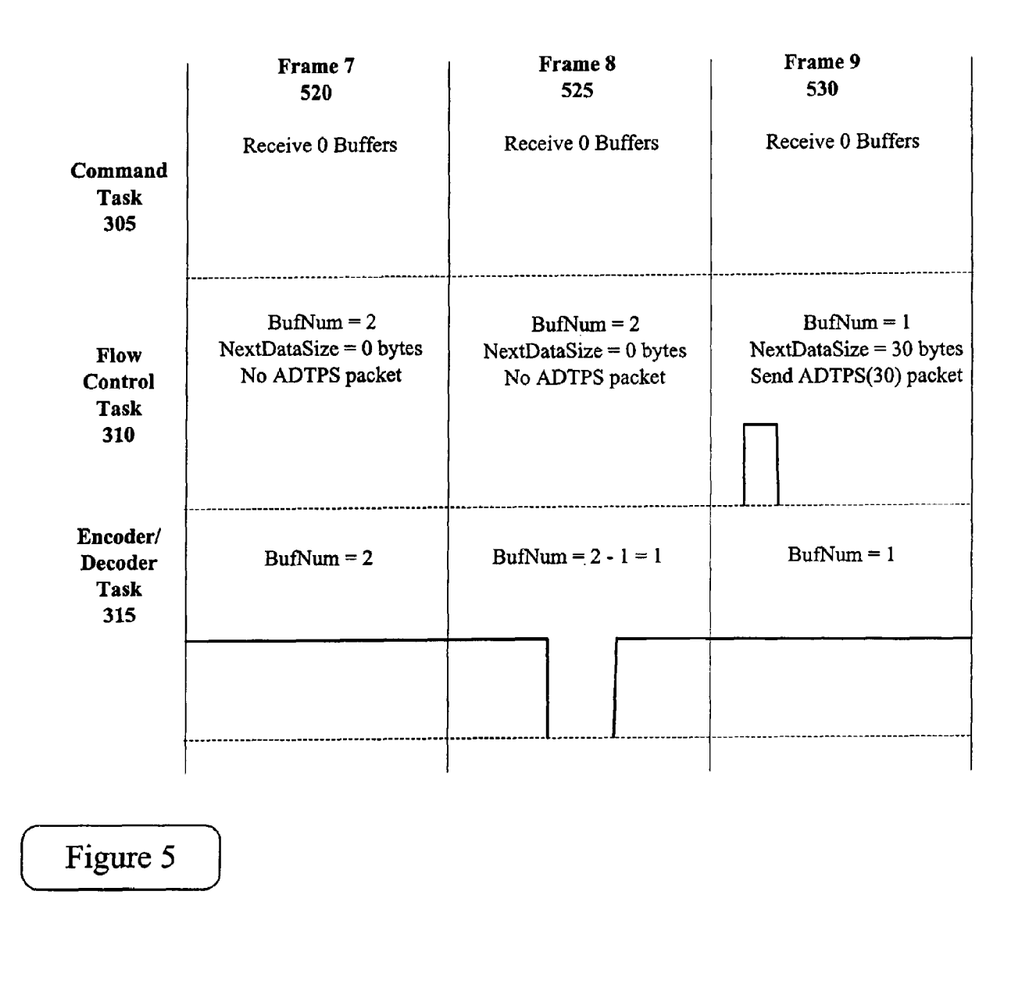
FIG. 5 illustrates an embodiment of signal transfers during a third set of time frames.

In FIGS. 3, 4, and 5 a particular example is illustrated. While any parameters may be used in conjunctions with an embodiment of the invention, for this example the relevant parameters are:

//30 millisecond block coder:
  Smsec=30
//Sbytes corresponds to Smsec in bytes, the value depending on the speed of the system. The value is assumed to be 30 bytes here:
  Sbytes=30
//In this example R equals Smsec and thus speed control is disabled:
  R=30
//A delay constant of 24 is assumed, a worst case scenario assumption:
  DelayConst=24
//Assuming no skip ahead support:
  SkipAheadDelay=0

With these parameters, the following initialization is used in the example:

//Indicating that initially the DSP has no data:
  BufNum=0
//MinBufNum to maintain in operation:
  MinBufNum=roundup[(12+24)/30]+0=2
//Initially 1 buffer is received as follows:
  InitBufNum=roundup[12/30]=1
//Size of data packet that CP is sending to the DSP:
  LastDataSize=Sbytes*1=Sbytes
//Delay indicates that coder can start right after the first time data is received:
  CoderDelay=0/roundup[12/30]+1=1

FIG. 3 illustrates an embodiment of signal transfers during a first set of time frames. The time period shown illustrates three blocks or frames of time. For example, each block may illustrate a 12 msec period. The illustration shows the actions for the command task 305, the flow control 310, and the coder 315. These are shown in relation to a first frame 320, a second frame 325, and a third frame 330. Initially one buffer is received. Based on data evaluation (such as by a skip ahead function), BufNum becomes 0+1=1. Computing the NextDataSize, BufNum is less than MinBufNum, which is 2, and thus:

NextDataSize=Sbytes*(MinBufNum−BufNum)

NextDataSize=30*(2−1)=30 bytes

Because the last packet size LastDataSize is also 30 bytes, there is no reason to adjust the data packet size and no ADTPS packet is sent by the flow control. There is no coder delay and the BufNum is decremented.

In the second frame 325, there is again one buffer received. The next data size is again 30 bytes and there is again no reason to modify the packet size. In the third frame 330, one buffer is again received, the BufNum is increase from zero to 1, and the next data size is again 30 bytes. The BufNum is decremented and the coder is processing the received data.

FIG. 4 illustrates an embodiment of signal transfers during a second set of time frames. The illustration again shows the actions for the command task 305, the flow control 310, and the coder 315. These are shown in relation to a fourth frame 420, a fifth frame 425, and a sixth frame 430. In the fourth frame, one buffer is again received and the buffer number becomes one. The next data size is 30 bytes and no ADTPS packet is sent. The coder is operating and thus the number of buffers is not decremented and remains at 1. In the fifth frame 425, a buffer is received, and the buffer number is increased to 2. The buffer number is now equal to the minimum buffer number and the next data size is changed to zero, with a delay. The coder task 315 is still operating and the buffer number remains at 2. In the sixth frame 430 a buffer is received and the buffer number is increased to 3. The next data size remains at 0 bytes and no ADTPS packet is sent. The coder task 315 decrements the buffer number to 2 and processes data.

FIG. 5 illustrates an embodiment of signal transfers during a third set of time frames. The illustration again shows the actions for the command task 305, the flow control 310, and the coder 315. These are shown in relation to a seventh frame 520, an eighth frame 525, and a ninth frame 530. In the seventh time frame 520, the CP has responded to the change in packet size and zero data buffers are received. The buffer number remains at 2, which is still equal to the minimum buffer number. The next data size remains at 0 and no ADTPS packet is sent. The coder task 315 is operating and does not decrement the buffer size. In the eighth frame, zero buffers are received, the BufNum becomes 2, the next data size is 2, and no ADTPS packet is sent. The coder task 315 completes a processing task, decrements the buffer number from 2 to 1, and begins processing again. In the nineth ninth time frame, zero buffers are received. The buffer number remains at 1, which is less than the minimum buffer number. For this reason, the next data size becomes 30 bytes and an ADTPS packet is sent to the CP. The coder task 510 is operating and the buffer number remains at 1. The process continues in succeeding frames. If skip ahead or speed change is imposed, thereby affecting which and how many data buffers are processed, then the flow control will recognize the change in data usage and adjust data packet requirements accordingly.

Figure 6:
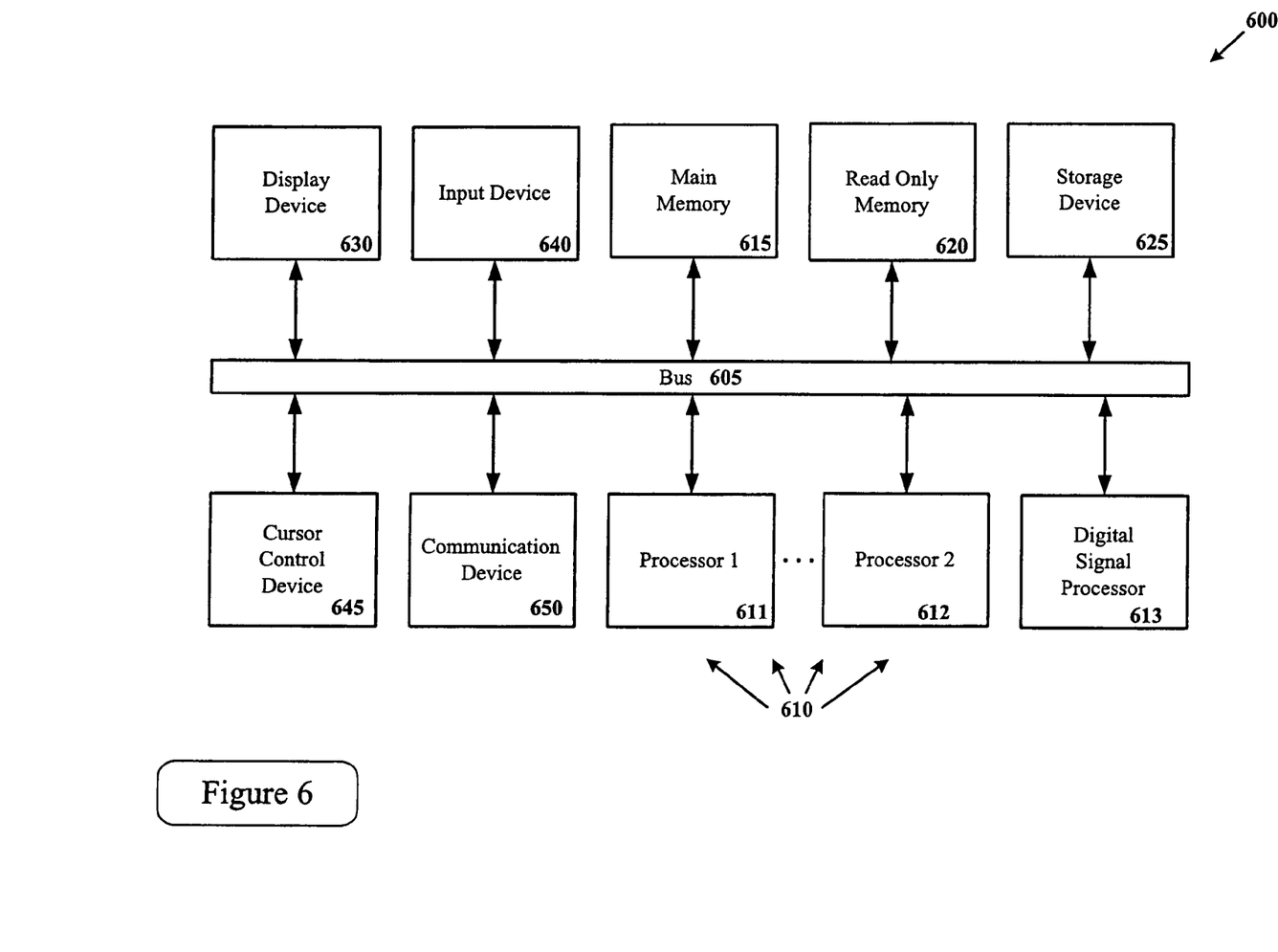
FIG. 6 illustrates an embodiment of a computer environment.

Techniques described here may be used in many different environments. FIG. 6 is block diagram of an embodiment of an exemplary computer. Under an embodiment of the invention, a computer 600 comprises a bus 605 or other communication means for communicating information, and a processing means such as one or more physical processors 610 (shown as 611 through 612) coupled with the first bus 605 for processing information. Each of the physical processors may include multiple logical processors, and the logical processors may operate in parallel in the execution of drivers. Each processor may include an execution unit and logic for the operation of certain functions. Further, the computer 600 includes a digital signal processor 613 for the processing of certain digital/discrete signals, including audio, video, and other media signals.

The computer 600 further comprises a random access memory (RAM) or other dynamic storage device as a main memory 615 for storing information and instructions to be executed by the processors 610. RAM memory may include dynamic random access memory (DRAM) and static dynamic random access memory (SRAM). Main memory 615 also may be used for storing temporary variables or other intermediate information during execution of instructions by the processors 610. Queues used in the scheduling of tasks may be implemented in the main memory 615. The computer 600 also may comprise a read only memory (ROM) 620 and/or other static storage device for storing static information and instructions for the processor 610.

A data storage device 625 may also be coupled to the bus 605 of the computer 600 for storing information and instructions. The data storage device 625 may include a magnetic disk or optical disc and its corresponding drive, flash memory or other nonvolatile memory, or other memory device. Such elements may be combined together or may be separate components, and utilize parts of other elements of the computer 600.

The computer 600 may also be coupled via the bus 605 to a display device 630, such as a liquid crystal display (LCD) or other display technology, for displaying information to an end user. In some environments, the display device may be a touch-screen that is also utilized as at least a part of an input device. In some environments, display device 630 may be or may include an auditory device, such as a speaker for providing auditory information. An input device 640 may be coupled to the bus 605 for communicating information and/or command selections to the processor 610. In various implementations, input device 640 may be a keyboard, a keypad, a touch-screen and stylus, a voice-activated system, or other input device, or combinations of such devices. Another type of user input device that may be included is a cursor control device 645, such as a mouse, a trackball, or cursor direction keys for communicating direction information and command selections to processor 610 and for controlling cursor movement on display device 630.

A communication device 650 may also be coupled to the bus 605. Depending upon the particular implementation, the communication device 650 may include a transceiver, a wireless modem, a network interface card, or other interface device. The computer 600 may be linked to a network or to other devices using the communication device 650, which may include links to the Internet, a local area network, or another environment.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method comprising:
   setting a buffer number to an initial value, the buffer number representing an amount of available data for a coder;
   receiving a first data packet of a data stream for processing by the coder during a first part of a first time frame, the data packet having a first data size, the first data size being the amount of data in the first data packet to be processed by the coder;
   increasing the buffer number by the first data value;
   comparing the buffer number to a minimum amount of data for the coder to determine whether sufficient data is available for the operation of the coder; and
   setting a second data size to be received in a subsequent data packet based on the comparison between the buffer number and the minimum amount of data for the coder.

2. The method of claim 1, further comprising sending a command message if the first data size does not equal the second data size.

3. The method of claim 2, wherein the command message is sent during an idle portion of the first time frame.

4. The method of claim 1, further comprising decrementing the buffer number prior to decoding the first data packet, the buffer number to be decremented by an amount of data to be processed by the coder.

5. The method of claim 1, further comprising receiving a command for increasing or decreasing the speed of the coder.

6. The method of claim 5, wherein the increase or decrease in speed of decoding results in a change in size of later data packets.

7. The method of claim 1, further comprising receiving a command for skipping ahead in the data stream.

8. The method of claim 1, wherein the data stream comprises an audio, video, or other media data stream.

9. The method of claim 1, wherein the coder comprises a parametric coder.

10. A signal processor comprising:
    an interface to a control processor, the signal processor to receive a plurality of data packets of a data stream from the control processor; and
    a coder to code the received data;
    the signal processor to control flow of data by:
      setting a data value to an initial data amount representing an amount of data available for processing by the coder;
      increasing the data value by an amount of data that can be passed to a coder from a first received data packet;
      comparing the data value to a minimum amount of data for the coder to determine whether sufficient data is available for the coder; and
      setting a second data size to be received in a subsequent data packet based on the comparison between the data value and the minimum amount of data for the coder.

11. The signal processor of claim 10, wherein the signal processor is to send a command message to request a change in size of data packets if the first data size does not equal the second data size.

12. The signal processor of claim 11, wherein the signal processor is to send the command message during an idle period in a time frame.

13. The signal processor of claim 10, wherein the signal processor is to decrement the data value prior to decoding the first data packet, the data value to be decremented by an amount of data to be processed by the coder.

14. The signal processor of claim 10, wherein the data stream comprises an audio, video, or other media data stream.

15. The signal processor of claim 10, wherein the coder comprises a parametric coder.

16. A system comprising:
    a processor;
    a bus, the processor being coupled to the bus;
    a DRAM memory coupled to the bus; and
    a signal processor comprising:
      a coder to code received data in a data stream;
      a flow control task to control the flow of data in the data stream to the signal processor, the flow control to comprise:
        setting a data value to an initial data amount, the initial data amount being an amount of data available for processing by the coder;
        increasing the data value by an amount of data that can be passed to a coder from a first received data packet;
        comparing the data value to a minimum amount of data for the coder to determine whether there is sufficient data available for the coder; and
        setting a second data size to be received in a subsequent data packet based on the comparison between the data value and the minimum amount of data for the coder.

17. The system of claim 16, wherein the signal processor is to send a command message to request a change in size of data packets if the first data size does not equal the second data size.

18. The system of claim 17, wherein the signal processor is to send the command message during an idle period in a time frame.

19. The system of claim 16, wherein the signal processor is to decrement the data value prior to decoding the first data packet, the data value to be decremented by an amount of data to be processed by the coder.

20. The system of claim 16, wherein the data stream comprises an audio, video, or other media data stream.

21. The system of claim 16, wherein the coder comprises a parametric coder.

22. A machine-readable medium having stored thereon data representing sequences of instructions that, when executed by a processor, cause the processor to perform operations comprising:
   setting a buffer number to an initial value, the buffer number representing an amount of data available for processing;
   receiving a first data packet of a data stream for processing during a first part of a first time frame, the data packet having a first data size, the first data size being the amount of data in the first data packet to be processed by a coder;
   increasing the buffer number by the first data size;
   comparing the buffer number to a minimum amount of data for the coder to determine whether there is sufficient data available for the coder; and
   setting a second data size to be received in a subsequent data packet based on the comparison between the buffer number and the minimum amount of data for the coder.

23. The medium of claim 22, wherein the sequences of instructions further comprise instructions for sending a command message if the first data size does not equal the second data size.

24. The medium of claim 23, wherein the command message is sent during an idle portion of the first time frame.

25. The medium of claim 22, wherein the sequences of instructions further comprise instructions for decrementing the buffer number prior to decoding the first data packet, the buffer number to be decremented by an amount of data to be processed by the coder.

26. The medium of claim 22, wherein the sequences of instructions further comprise instructions for receiving a command for increasing or decreasing the speed of the coder.

27. The medium of claim 26, wherein the increase or decrease in speed of decoding results in a change in size of later data packets.

28. The medium of claim 22, wherein the sequences of instructions further comprise instructions for receiving a command for skipping ahead in the data stream.

29. The medium of claim 22, wherein the data stream comprises an audio, video, or other media data stream.

30. The medium of claim 22, wherein the coder comprises a parametric coder.

* * * * *

UNITED STATES PATENT AND TRADEMARK OFFICE
CERTIFICATE OF CORRECTION

PATENT NO. : 7,219,171 B2 Page 1 of 1
APPLICATION NO. : 10/740249
DATED : May 15, 2007
INVENTOR(S) : Guduru It is certified that error appears in the above-identified patent and that said Letters Patent is hereby corrected as shown below:

In column 7, at line 34, delete "nineth".

Signed and Sealed this

Fifteenth Day of April, 2008

JON W. DUDAS
*Director of the United States Patent and Trademark Office*